United States Patent

Ogawa et al.

[11] Patent Number: 5,990,964
[45] Date of Patent: Nov. 23, 1999

[54] METHOD AND APPARATUS FOR PROCESSING TIME CODE

[75] Inventors: Tetsuo Ogawa; Hiroshi Kiriyama; Tomokiyo Kato; Hiroaki Kikuchi, all of Kanagawa, Japan; Luke Freeman, Redwood City, Calif.

[73] Assignees: Sony Corp., Tokyo, Japan; Sony Electronics, Park Ridge, N.J.

[21] Appl. No.: 08/717,660

[22] Filed: Sep. 23, 1996

[51] Int. Cl.⁶ .............................. H04N 7/01; H04N 11/20
[52] U.S. Cl. ...................... 348/441; 348/445; 348/446; 348/772
[58] Field of Search ..................... 348/441, 445, 348/446, 443, 772, 911; H04N 7/01, 11/20

[56] References Cited

U.S. PATENT DOCUMENTS

| | | | |
|---|---|---|---|
| 4,633,293 | 12/1986 | Powers | 348/441 |
| 4,998,287 | 3/1991 | Katznelson et al. | 382/34 |
| 5,115,311 | 5/1992 | Jaqua | 348/911 |
| 5,260,787 | 11/1993 | Capitant et al. | 348/441 |
| 5,317,398 | 5/1994 | Casavant et al. | 348/441 |
| 5,528,381 | 6/1996 | Capizzo et al. | 358/335 |
| 5,671,008 | 9/1997 | Linn | 348/105 |
| 5,734,420 | 3/1998 | Lee et al. | 348/441 |

FOREIGN PATENT DOCUMENTS

| | | |
|---|---|---|
| 047322A1 | 3/1992 | European Pat. Off. . |
| 97304168 | 4/1999 | European Pat. Off. . |
| WO95/21505 | 8/1995 | WIPO . |

Primary Examiner—Nathan Flynn
Assistant Examiner—Vivek Srivastava
Attorney, Agent, or Firm—Pasquale Musacchio; Jerry A. Miller

[57] ABSTRACT

A method for processing a time code including the steps of generating information, indicating whether or not a location is proper for editing when converting picture information of a predetermined system into picture information of another system, and writing the information to the time code data accompanied with the picture information of the second system.

9 Claims, 17 Drawing Sheets

METHOD AND APPARATUS FOR PROCESSING TIME CODE

BACKGROUND OF THE INVENTION

1. Field of the Invention

The present invention relates to a method and an apparatus for processing a time code used for an editing operation involving converting picture information of a predetermined system into that of another system.

2. Description of the Related Art

For broadcasting or producing a video software package of picture information originally imaged on cinema film for release to the public in a theater, the picture information is frequently converted into a standard video signal of an NTSC (National Television System Committee) system or a PAL (Phase Alternating by Line) system.

For this purpose, a system arranged to use a telecine apparatus serving as a picture scanning device has been considered. Such a device is illustrated in FIG. 1. As an example, the following description will be directed to the conversion of picture information captured on cinema film into a video signal of the NTSC system.

Normally, cinema film 1 is imaged at a rate of 24 frames per second. To obtain a video signal of the NTSC system, that is, a video signal having 525 scan lines and field frequency of 59.94 Hz, the telecine apparatus 2 operates to reproduce the picture information imaged on the cinema film 1 at a rate of 24 frames per second (precisely, 24/1.001= 23.97602398), which is the same as the imaging speed. Then, a field frequency converting unit 3 operates to perform a so-called 3:2 pull-down process.

As shown in FIG. 2, the so-called 3:2 pull-down process is a process that is executed to perform interlaced scanning of the cinema film for converting an even field of the film into an even field of a video signal and an odd field of the film into an odd field of the video signal. Since one frame of the cinema film is composed of two of the same fields with no time lag, the field frequency converting unit 3 operates to output the video signal of the NTSC system without any unfavorable time lag. Four frames on the input side are converted into one frame on the output side. Since no undesirable arrangement of the field order inside of the frame takes place, an observer feels no unnatural reproduction of the picture.

When reproducing a still frame video signal of the NTSC system in the fashion described above, the reproduced picture can be created in an undesirable fashion because the picture of a field of a given frame of the video signal is different from the picture of its adjacent field of the same frame unless a reproducing start point is properly selected.

In FIG. 2, when setting a reproducing start point to the 02 frame (F) of the video signal, the 02 frame of the video signal is produced from fields of the 01 frame and 02 frame of the cinema film. Between the two fields a time lag exists. As a result, an observer senses an unnatural reproduction of the still frame video signal. Accordingly, it is desirable to provide a system overcoming these prior art shortcomings.

SUMMARY OF THE INVENTION

The present invention is directed to overcoming the foregoing shortcoming. It is an object of the present invention to provide a time code processing method and apparatus for generating a time code for automatically determining a proper start point for editing.

According to an aspect of the invention, a time code processing method includes the steps of generating information indicating if a location is suitable for editing when converting picture information of a predetermined system into picture information of a different system and writing the generated information to the time code data accompanying the picture information of the different system. Hence, this method enables a user to generate time code for automatically determining a suitable start point for editing.

According to another aspect of the invention, a time code processing apparatus includes means for generating editing location information and time code generating means for writing the editing location information to time code data accompanying the picture information. Hence, the apparatus enables a user to generate time code for automatically determining a suitable start point for editing.

BRIEF DESCRIPTION OF THE DRAWINGS

FIG. 5 shows the format of an LTC signal for processing by the adapter of FIG. 4;

FIG. 6 shows the format of a VITC signal for processing by the adapter of FIG. 4;

DESCRIPTION OF THE PREFERRED EMBODIMENTS

Figure 3:
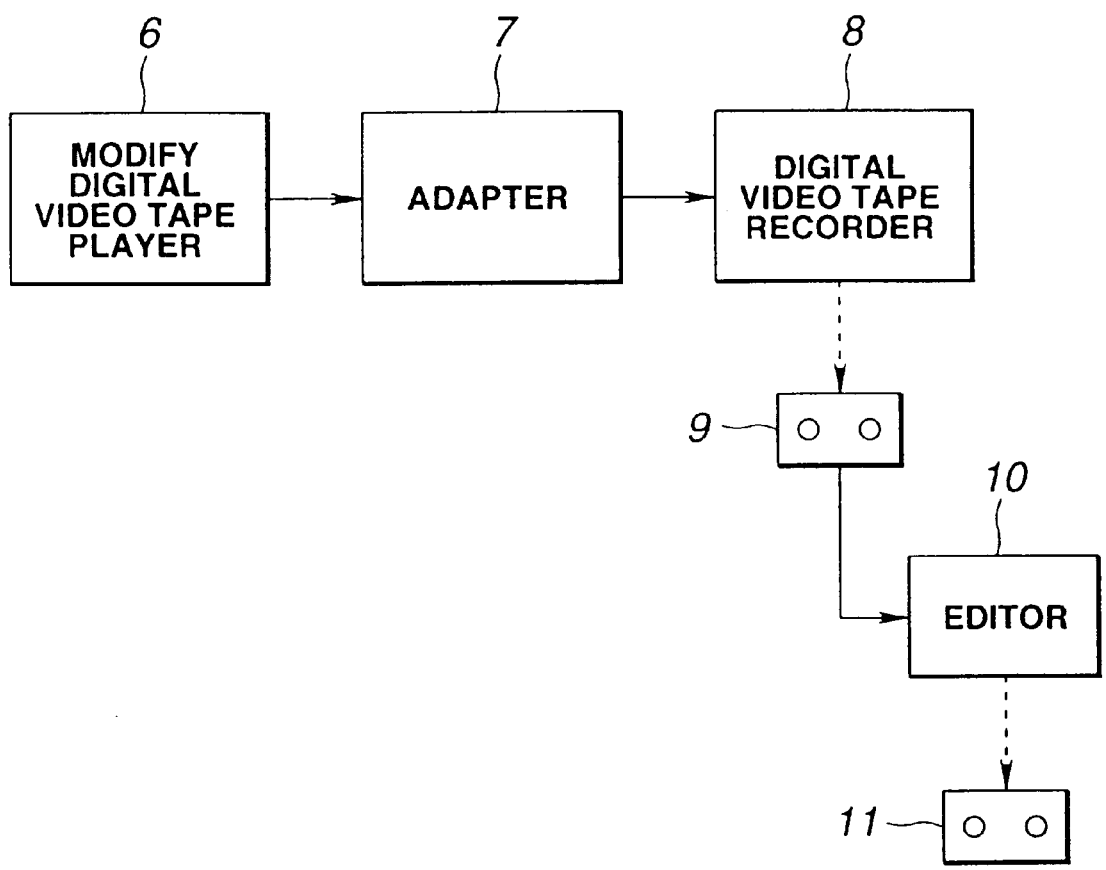
FIG. 3 is a block diagram showing an embodiment of a picture information editing system for editing picture information according to the present invention.

With reference to the drawings, this description is directed to a method and an apparatus for processing a time code according to an embodiment of the present invention. The embodiment of the invention concerns a picture information editing system 5 as shown in FIG. 3. The editing system 5 is operated to edit converted picture information with a converted time code obtained by the method and the apparatus of the present invention.

Figure 1:
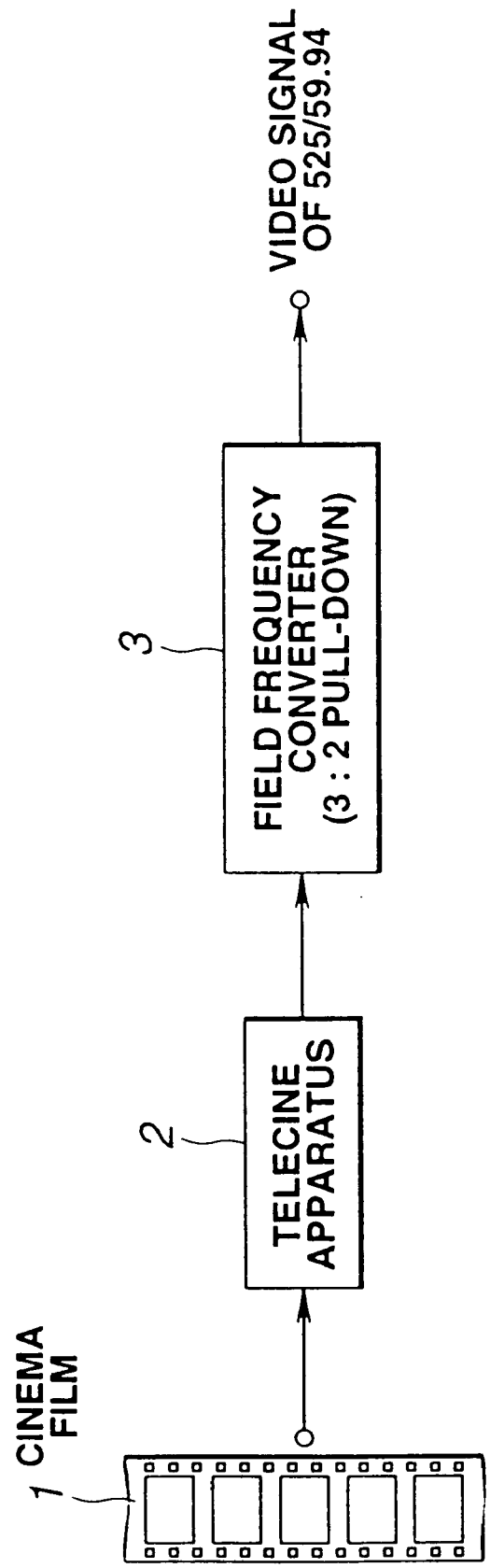
FIG. 1 is a block diagram showing a system for converting picture information imaged on cinema film into a standard video signal of an NTSC system.

The picture information editing system 5 of FIG. 3 is arranged to edit an NTSC system video signal having 525 scan lines/field frequency of 59.94 Hz (also called an NTSC system video signal or simply 525/59.94). The NTSC system video signal is produced by first converting picture information imaged on cinema film at a rate of 25 frames per second into a video signal having 625 scan lines/field frequency of 50 Hz through the use of a telecine apparatus (FIG. 1) and then converting the video signal into the NTSC system video signal of 525/59.94.

The editing system 5 includes a modifying digital video tape player 6 for variably reproducing a video signal of 625/50 recorded on a video tape and an adapter 7 for converting the variably reproduced video signal into a video signal of 525/59.94. The adapter 7 performs the functions of mapping a time code, writing a "No-good" mark to the time code date indicating an improper location for editing and outputting the time code data. The editing system 5 further includes a digital video tape recorder 8 for recording the NTSC system video signal of 525/59.94 and the time code including the "No-good" mark thereon on a video tape cassette 9, and an editor 10 for editing the video signal of 525/59.94 having the time code.

The modifying digital video tape player 6 may be a video tape recorder of a D-1 format (called a D-1 video tape recorder), for example. The D-1 video tape recorder for this purpose must include a variable reproducing speed, the detail of which will be described below.

The arrangement of the adapter 7 will next be described with reference to FIG. 4. The adapter 7 includes a vertical interval time code (VITC) reader 14 for reading the vertical interval time code from the video signal provided the modifying digital video tape player 6 (FIG. 3). The adapter 7 also includes a system converter 15 for converting a scan line number and a field frequency into the NTSC system video signal of 525/59.94 based on the VITC and for providing field sequence information used in converting the field frequency. The adapter 7 further includes a time code reader 16 for reading a longitudinal time code (called LTC); a CPU 17 for generating converted time code data of the NTSC system based on the LTC data read by the time code reader 16 and generating information indicative of an improper editing location based on the field sequence information; a time code generator 18 for writing a "No-good" mark to a binary group of a converted time code data indicating an improper editing location; and a control interface 19 for feeding reproducing speed information (n%) from the modifying digital video tape recorder 6 (FIG. 3) to the CPU 17.

At this point it is appropriate to note that for editing picture information it is essential to know the location of a video tape. For this purpose, a time code is used. The time code contains the LTC to be recorded lengthwise on the video tape and the VITC to be inserted into the vertical interval.

Figure 5:
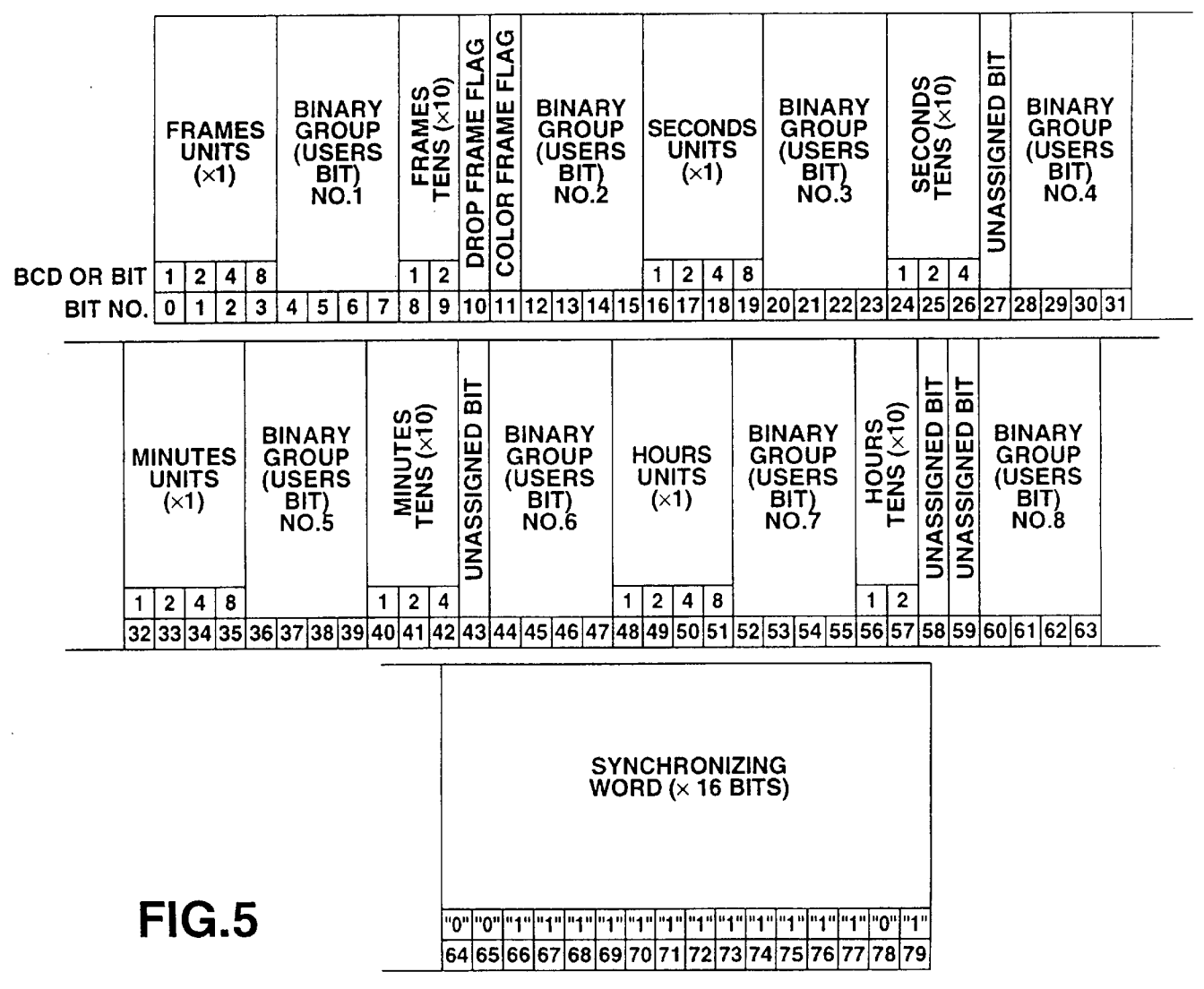

As shown in FIG. 5, the LTC is composed of 80 bits (00 to 79) in total containing time information and user's bits of 64 bits per frame and synchronous word bits of 16 bits per frame. The time information contains a 24-hour system code format in which a time digit is 00 to 23 hours, a minute digit is 00 to 59 minutes and a second digit is 00 to 59 seconds. For the PAL system video signal, the frame value may have 25 numbers ranging from 00 to 24 frames. For the NTSC system video signal, the frame value may have 30 frames ranging from 00 to 29 frames. The modifying system is a self-clock type, width modulation system called as a biphase mark, in which a clock inversion (transition) takes place at the start point for each bit period, when a bit value is "1", a transition takes place in a center of a period, and when a bit value is "0", no transition takes place in the center of the period.

Figure 6:
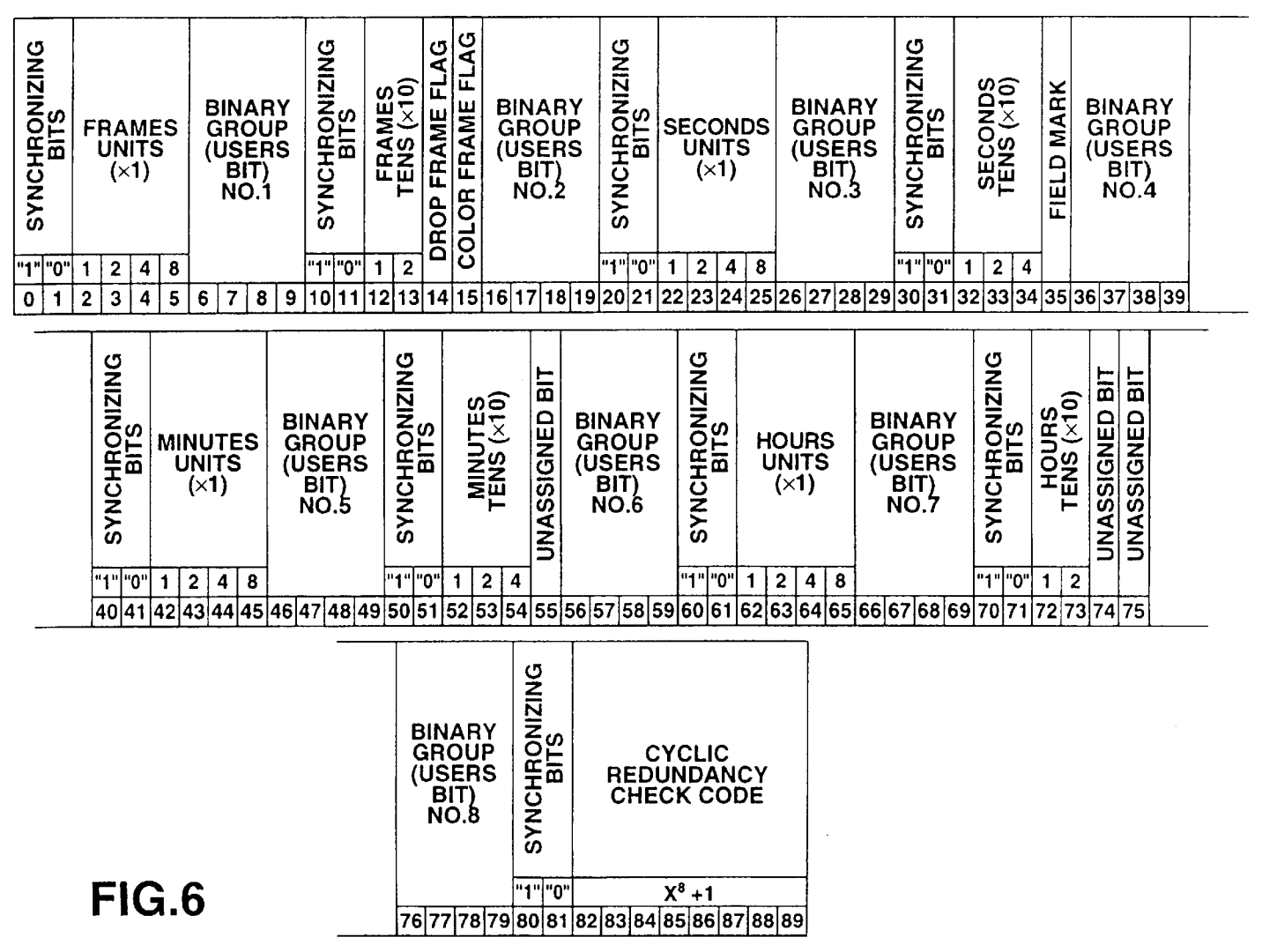

As shown in FIG. 6, the VITC is composed of 90 bits including the 64 LTC bits, four synchronous bits added to each group of eight bits, and a CRC code of eight bits. The transition takes place only when the change between the adjacent bit cells takes place such as "1" to "0" or "0" to "1". In this case, the modifying system takes a binary signal format. No transition takes place when adjacent values are equal.

The system 5 of FIG. 3 for editing picture information according to this embodiment may use a time code containing both the LTC and VITC. Herein, the description will be directed to an editing system 5 arranged to use the LTC.

Turning back to FIG. 4, the LTC included in the video signal of 625/50 fed from the modifying digital video tape player 6 (FIG. 3) is supplied to a time code reader 16. The time code reader 16 operates to extract a clock signal from the LTC. The time code reader 16 further operates to decode the LTC and output the time code data and the binary bit.

Figure 7:
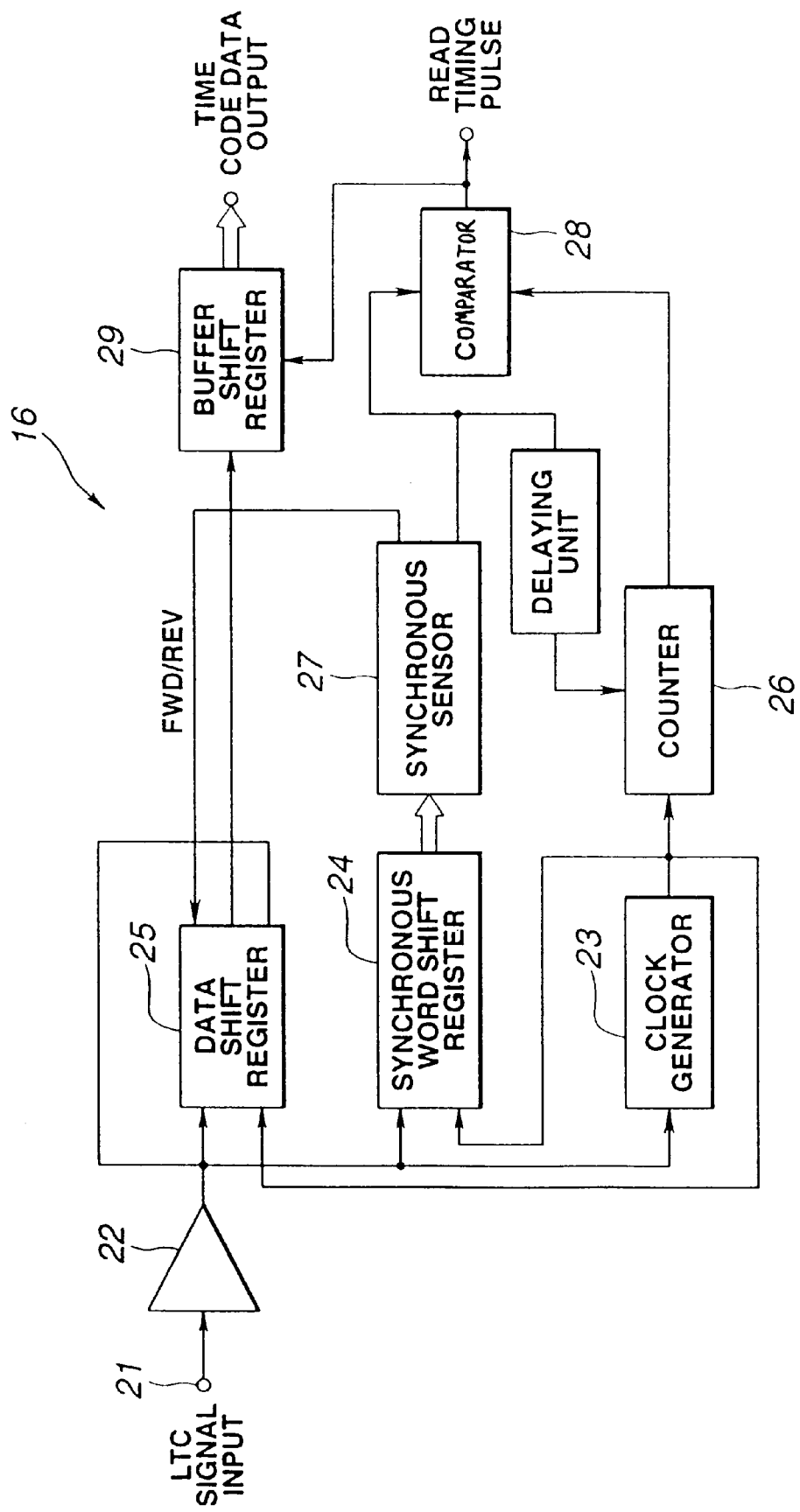
FIG. 7 is a block diagram showing a time code reader that is a component of the adapter of FIG. 4.

The circuit arrangement of the time code reader 16 is shown in FIG. 7. The LTC, to which the biphase mark signal is added, is supplied to a clock generator 23, a synchronous word shift register 24 and a data shift register 25 through a buffer 22 from an input terminal 21. The clock generator 23 operates to extract a clock signal from the biphase mark signal and supply the clock signal to the synchronous word shift register 24, the data shift register 25 and a counter 26.

The synchronous word shift register 24 operates to read the biphase mark signal on the timing of the clock from the clock generator 23. Then, the register 24 enables a synchronous sensor 27 to sense a synchronous word bit having a synchronous portion of 12 consecutive "1's". The synchronous sensor 27 operates to sense if two bits following the synchronous word bits are "00" or "01" and supplies a read direction signal of FWD/REV to the data shift register 25.

The data shift register 25 operates to read the biphase mark signal in response to the read direction signal from the synchronous sensor 27. The counter 26 operates to count eighty clock periods generated by the clock generator 23. When the counter 26 reaches its count, a comparator 28 operates to compare the counted clock periods with the synchronous signal in view of the timing and then outputs a timing pulse for reading data if it determines the input data is a correct data group. Then, the time code data of 64 or 32 bits is output from a buffer shift register 29. The time code data is supplied from the time code reader 16 to the CPU 17.

The LTC is supplied as the time code to the CPU 17. The CPU 17 operates to generate the converted time code data based on this LTC and supplies it to the time code generator 18. The CPU 17 also receives the field sequence information from the system converter 15. This field sequence information indicates how the picture fields are re-ordered when the system converter 15 converts the field frequency. With this field sequence information, the CPU 17 operates to generate information for indicating an improper location for an editing point.

Figure 8:
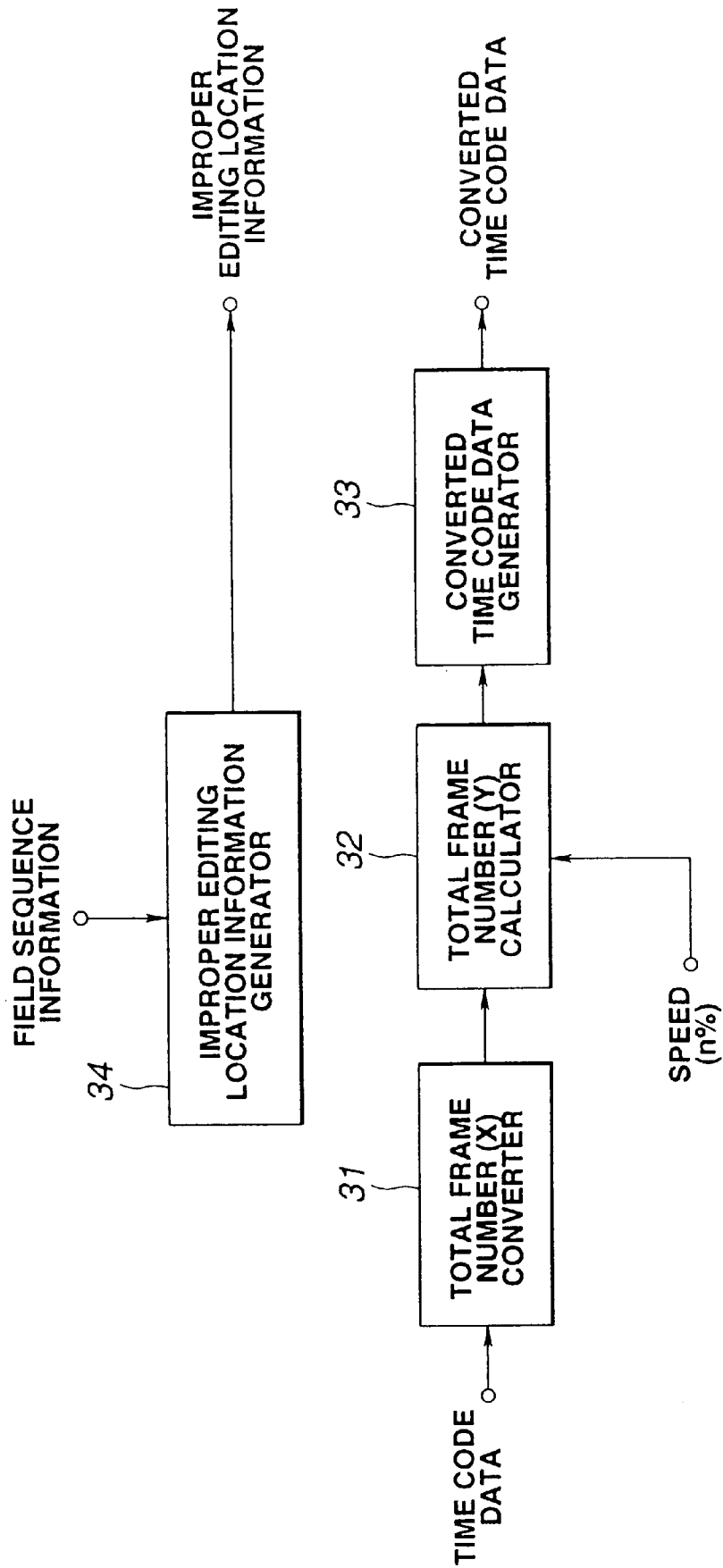
FIG. 8 is a block diagram showing a CPU that is a component of the adapter of FIG. 4.

The circuit arrangement of the CPU 17 is shown in FIG. 8. The CPU 17 includes a total frame number converter 31 for converting the time code data sent from the time code reader 16 (FIG. 4) into a total frame number x, a total frame number calculator 32 for calculating a total frame number y of the converted time code data from the total frame number x, a converted time code data generator 33 for generating the converted time code data from the total frame number y, and an improper editing location information generator 34 for generating information about an improper editing location from the field sequence information.

The total frame number converter 31 operates to convert the time code data AhBmCsDf consisting of the read time (h) minute (m) second (s) frame (f) into a total frame number x derived by the expression of $(60A+B)\times60)+C)\times25+D$. The total frame number calculator 32 operates to calculate the total frame number y from the total frame number x based on the expression of $Y/30=x/25/(1+n/100)$, where n is reproducing speed information indicating how much the reproducing speed is varied as compared with the recording speed in the modifying digital video tape player 6. The reproducing speed information is obtained through the effect of a control interface 19 (FIG. 4). For example, if the reproducing speed of the modifying digital video tape player 6 is made equal to the recording speed, n is 0 (%).

The converted time code data generator 33 operates to generate the converted time code data consisting of a time-minute-second frame from the total frame number y obtained by the foregoing expression.

The improper editing location information generator 34 operates to determine whether the system-converted picture frame is composed of different frames on the source side based on the field sequence information. If the frame is composed of different frames, that is, a time lag takes place, the improper editing location information is generated. The improper editing location information is supplied to a time code generator 18 together with the converted time code data and then is written to the user's bits of the time code of the improper frames for editing.

Below is described the operation of writing the improper editing location information to the binary bit group if the reproducing speed information n is approximately 0% or −4%.

First will be described how the modifying digital video tape player 6 performs the 0% reproduction in which the reproducing speed information n is almost 0%. Precisely, the 0% reproduction is 0.01% reproduction with 625 scan lines/field frequency of 49.95 Hz.

Figure 9:
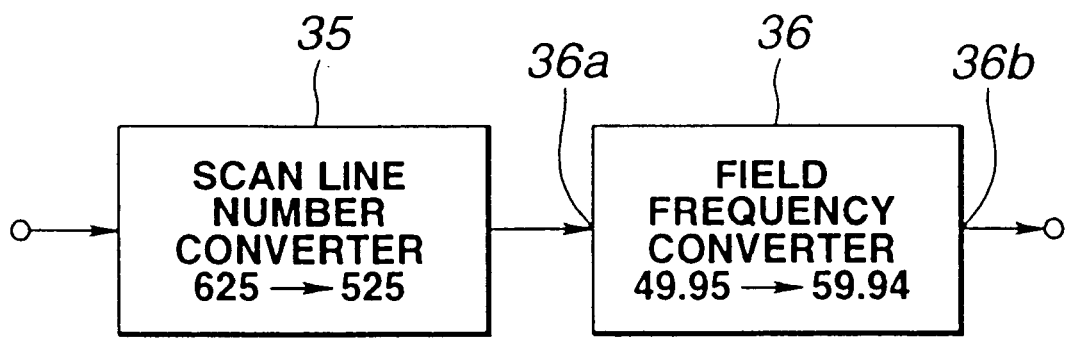
FIG. 9 is a block diagram showing an embodiment of a system converter that is a component of the adapter of FIG. 4.

As shown in FIG. 9, the system converter 15 includes a scan line number converter 35 for converting the number of scan lines of the video signal from 625 into 525 scan lines and a field frequency converter 36 for converting a field frequency of the video signal of 49.95 into 59.94 Hz.

The scan line number converter 35 operates to interpolate 625 scan lines into 525 scan lines. This converter 35 performs a vertical filtering operation on the 576 active lines of the 625 scan lines to obtain 486 active lines for deriving 525 scan lines. The vertical resolution appearing in 625 scan lines is higher than that appearing in 525 scan lines. Hence, no loss of the vertical resolution occurs in the re-sampling process, which results in enhancing the quality of the resulting picture.

The field frequency converter 36 operates to convert the field frequency of 49.95 Hz into 59.94 Hz by increasing the frequency of 49.95 Hz 6/5 times. This operation is the so-called 3:2:3:2:2 pull-down process.

The 3:2:3:2:2 pull-down process will be described with reference to FIG. 10. An interlaced scan is executed for the video signal having a field frequency of 49.95 Hz so that an even field on an input side 36a is converted into an even field on an output side 36b and an odd field on the input side 36a is converted into an odd field on the output side 36b. The video signal on the input side 36a has no time lag within the same frame. Hence, the converted video signal does not include unfavorable time conditions. Five frames on the input side are converted into one frame on the output side. However, since no unfavorable condition takes place in the field sequence inside of the frame, a watcher does not feel any unnatural motion of the picture.

Information about the conversion of the sequence of the picture fields is supplied as field sequence information to the CPU 17. This field sequence information is used by the CPU 17 for generating the conversion time code data and the improper editing location information.

Figure 10:
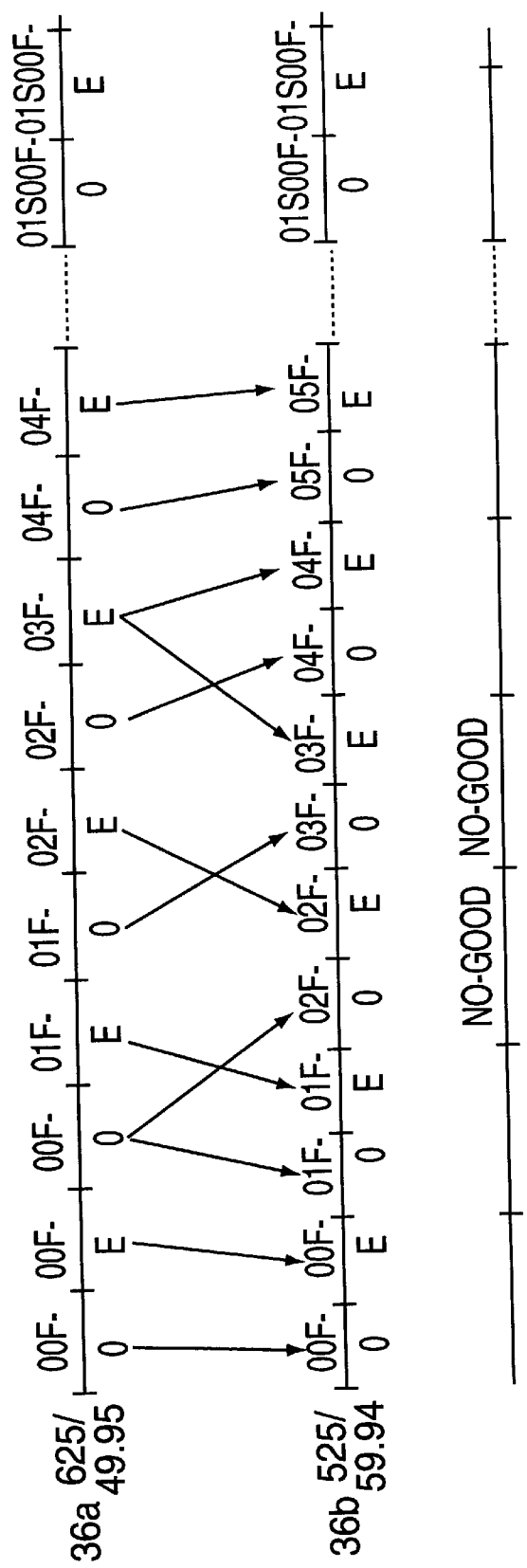
FIG. 10 shows the operation of a field frequency converting unit that is a component of the system converter of FIG. 9.

The converted time code data is composed of an iteration of loops each completed at least within a period shown in FIG. 10. In this case, the mapping of the five frames of 625/49.95 and the six frames of 525/59.94 makes it possible to constantly and uniquely define the converted time code on the target side 36b against the time code on the source side 36a. Hence, the time code on the source side is equalized to the time code on the target side second by second.

The improper editing location information is indicated as a "No-good" mark on 02 frame on the 525/59.94 side and is composed of the 01 and the 02 frames on the 625/49.95 side. The frames with the "No-good" marks are considered improper frames for editing and distinguished from the other frames.

Next, the description will be directed to the −4% reproduction speed of the modifying digital video tape player 6 (FIG. 3), i.e., the reproducing speed information n is −4%. In the −4 % reproduction case, the video signal recorded at a rate of 25 frames per second is reproduced at a rate of 24 frames per second. That is, the video signal recorded at 625/50 is reproduced at 625/48 (actually, 47.95).

Figure 11:
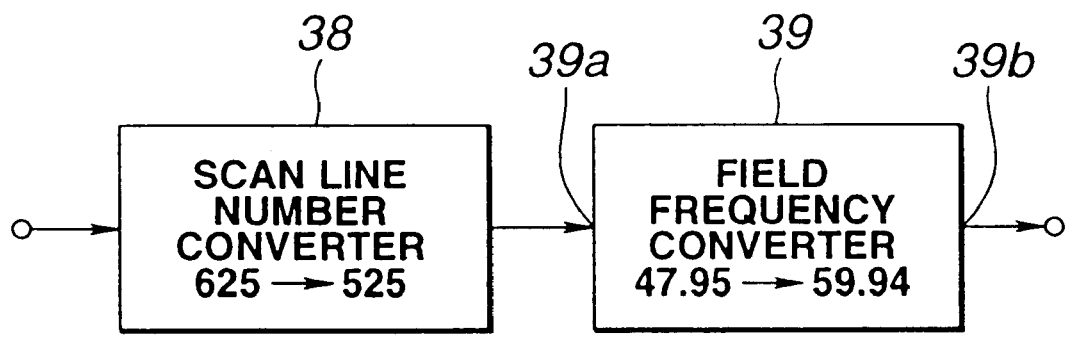
FIG. 11 is a block diagram showing an alternative embodiment of a system converter that is a component of the adapter of FIG. 4.

As shown in FIG. 11, in this case the system converter 15 (FIG. 4) includes a scan line converter 38 for converting the number of scan lines of the video signal from 625 into 525 and a field frequency converter 39 for converting the field frequency of the video signal from 47.95 into 59.94 Hz.

The scan line converter 38 operates to interpolate 625 scan lines into 525 lines. The scan line converter 38 performs a vertical filtering operation on the 576 active lines of the 625 scan lines to obtain 486 active lines. As a result, the converter 38 produces 525 scan lines. The vertical resolution appearing in the case of 625 scan lines is higher than that in the case of 525 scan lines. In the re-sampling process, therefore, no loss takes place in the vertical resolution, which may result in providing higher picture quality.

In order to convert the field frequency of 47.95 Hz into 59.94 Hz by increasing it 5/4 time, the field frequency converter 39 performs the so-called 3:2 pull-down process.

The so-called 3:2 pull-down process will be described with reference to FIG. 12. An interlaced scan is executed for the video signal of the field frequency of 47.95 Hz so that an even field on an input side 39a is converted into an even field on an output side 39b and an odd field on the input side 39a is converted into an odd field on the output side 39b. The video signal on the input side 39a has no time lag within the same frame. Hence, the converted video signal does not have any unfavorable time condition. Four frames on the input side 4 are converted into one frame on the output side.

However, since no unfavorable condition takes place in the field sequence inside of the frame, a watcher does not feel any unnatural motion of the picture.

Figure 4:
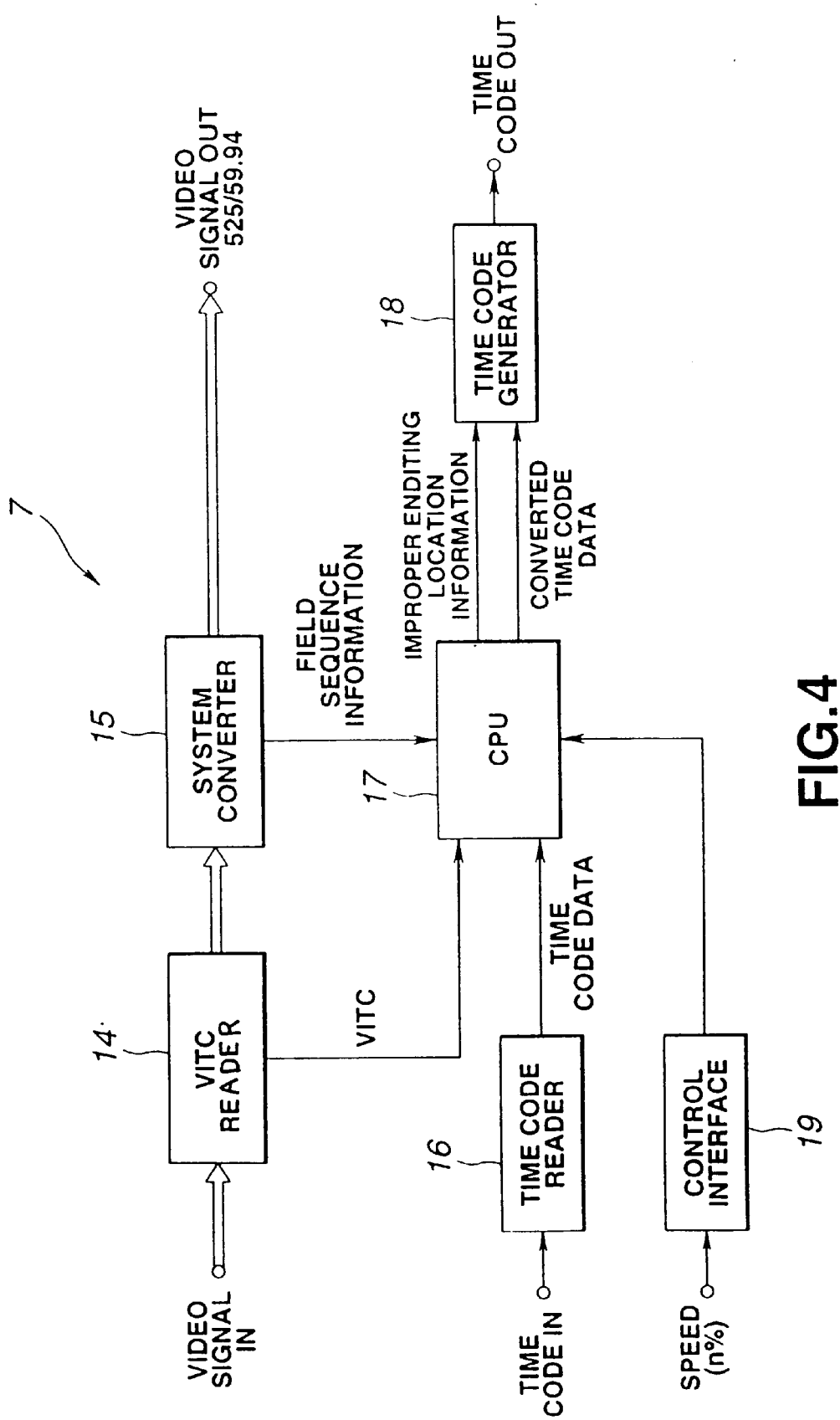
FIG. 4 is a block diagram showing an adapter that is a component of the system for editing picture information of FIG. 3.

Information about the conversion of the sequence of picture fields is supplied as field sequence information from the field frequency converter 39 to the CPU 17 (FIG. 4). This field sequence information is used by the CPU 17 for generating the converted time code data and the improper editing location information.

In this case, a loop in which the head of a frame coincides with the head of another frame is executed repetitively for four frames of the 625/47.95 video signal and five frames of the 525/59.94 video signal. In the case of normal advancement, a loss of one frame per second takes place in the converted time code.

Hence, a value of n=−4 is represented in the foregoing operation expression executed by the total frame number calculator 32 provided in the CPU 17. That is, after a value of y is calculated from the expression of y/30=x/25/(1+(−4)/100), the CPU 17 enables the converted time code data generator 33 to generate the converted time code data.

That is, since the CPU 10 performs the absolute mapping function, the time code can be uniquely defined even if the modifying digital video tape player 6 performs reproduction at a n=−4) % variable speed.

Figure 12:
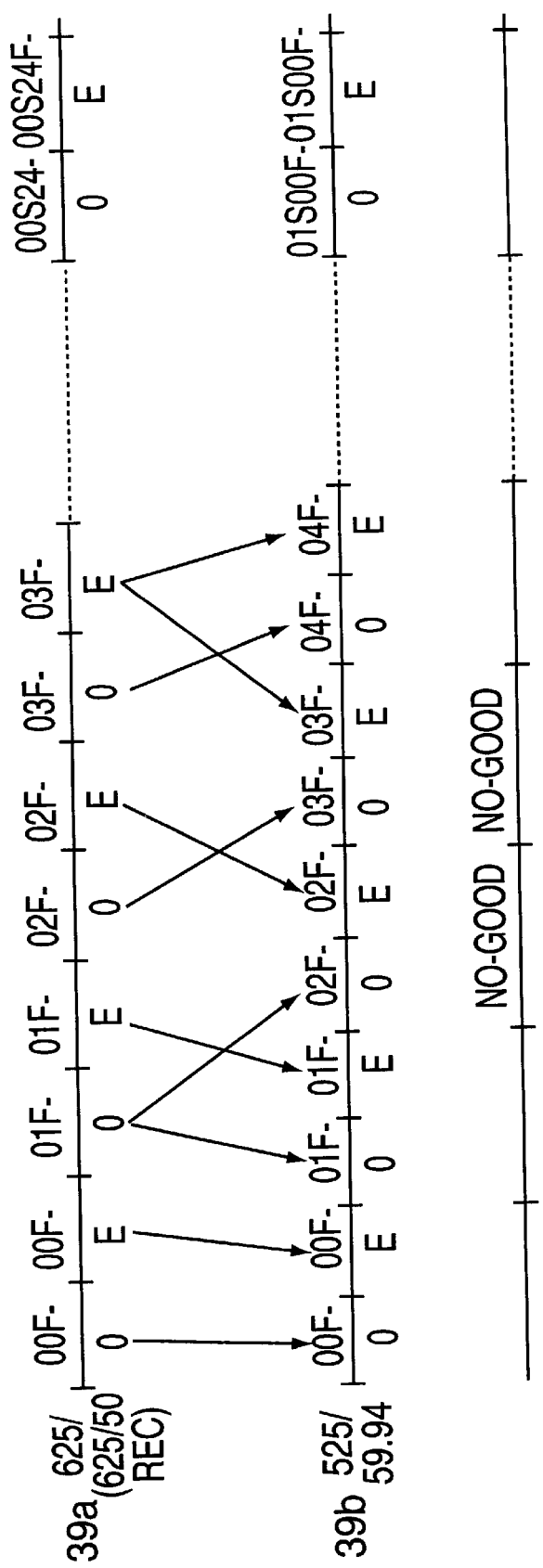
FIG. 12 shows the operation of a field frequency converting unit that is a component of the alternative embodiment system converter of FIG. 11.

As shown in FIG. 12, the improper editing location information is indicated as a "No-good" mark to the 02 frame on the 525/59.94 side, which is composed of the 01 and the 02 frames on the 625/47.95 side, and the 03 frame on the 525/59.94 side, which is composed of the 02 and the 03 frames on the 625/47.95 side. The frames with the "No-good" mark indicated thereon are recognized as improper frames for editing and are distinguished from the other frames.

The time code generator 18 (FIG. 4) receives the converted time code data and the improper editing location information and supplies the converted time code, which as noted above, distinguishes the improper frames for editing from the other frames.

Figure 13:
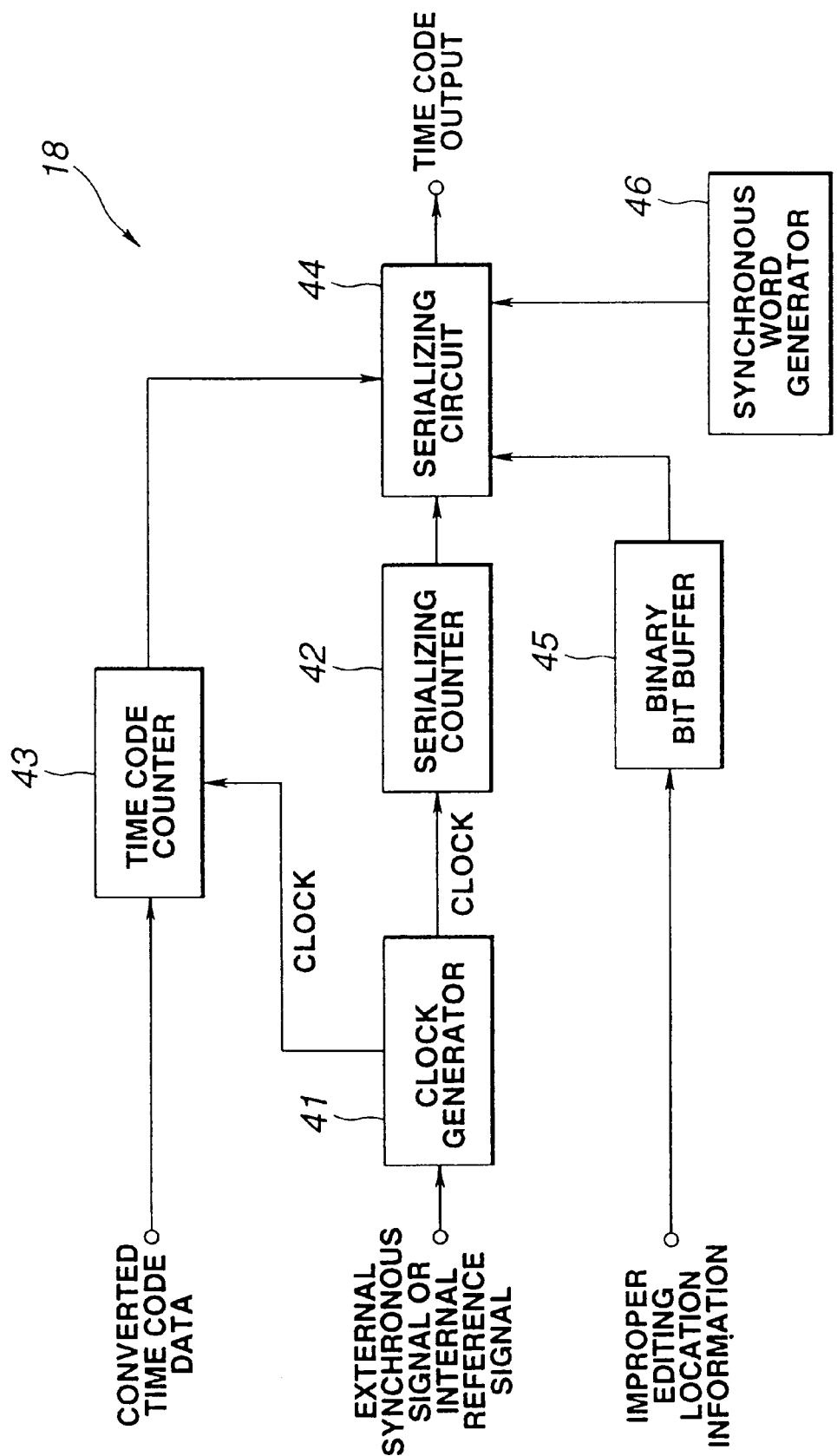
FIG. 13 is a block diagram showing a time code generator that is a component of the adapter of FIG. 4.

The circuit diagram of the time code generator 18 (FIG. 4) will next be described in connection with FIG. 13. Clock pulses generated by a clock generator 41 (based on an external synchronous or an internal reference signal) are supplied to a serializing counter 42 and a time code counter 43. The time code counter 43 receives the converted time code data from the CPU 17 (FIG. 4). The time code counter 43 then determines the new location of the converted time code for the NTSC system video signal. The time code for the NTSC system is supplied to a serializing circuit 44. The serializing circuit 44 receives the user's bits from a binary bit buffer 45 and the synchronous signals from a synchronous word generator 46.

The binary bit buffer 45 receives the improper editing location information. Then, the improper editing location information specified as user's bits by the binary bit buffer 45 is written in the binary group of the format shown in FIG. 5 through the operation of the serializing circuit 44.

Next, the serializing circuit 44 operates to output converted time code having the improper editing location information written to the binary group. During the foregoing operation, the converted time code having the improper editing location information written therein is supplied from the adapter 7 to the digital video tape recorder 8 (FIG. 3). The system-converted video signal is supplied from the adapter 7 to the digital video tape recorder 8. The digital video tape recorder 8 operates to record the system-converted video signal and the system-converted time code on the video tape cassette 9.

As noted above, the modifying digital video tape player 6 (FIG. 3) used in the picture information editing system 1 may be a D-1 format video tape recorder. The D-1 video tape player is a video tape player normalized on the so-called 4:2:2 component coding system for CCIR. Rec. 601.

Figure 14:
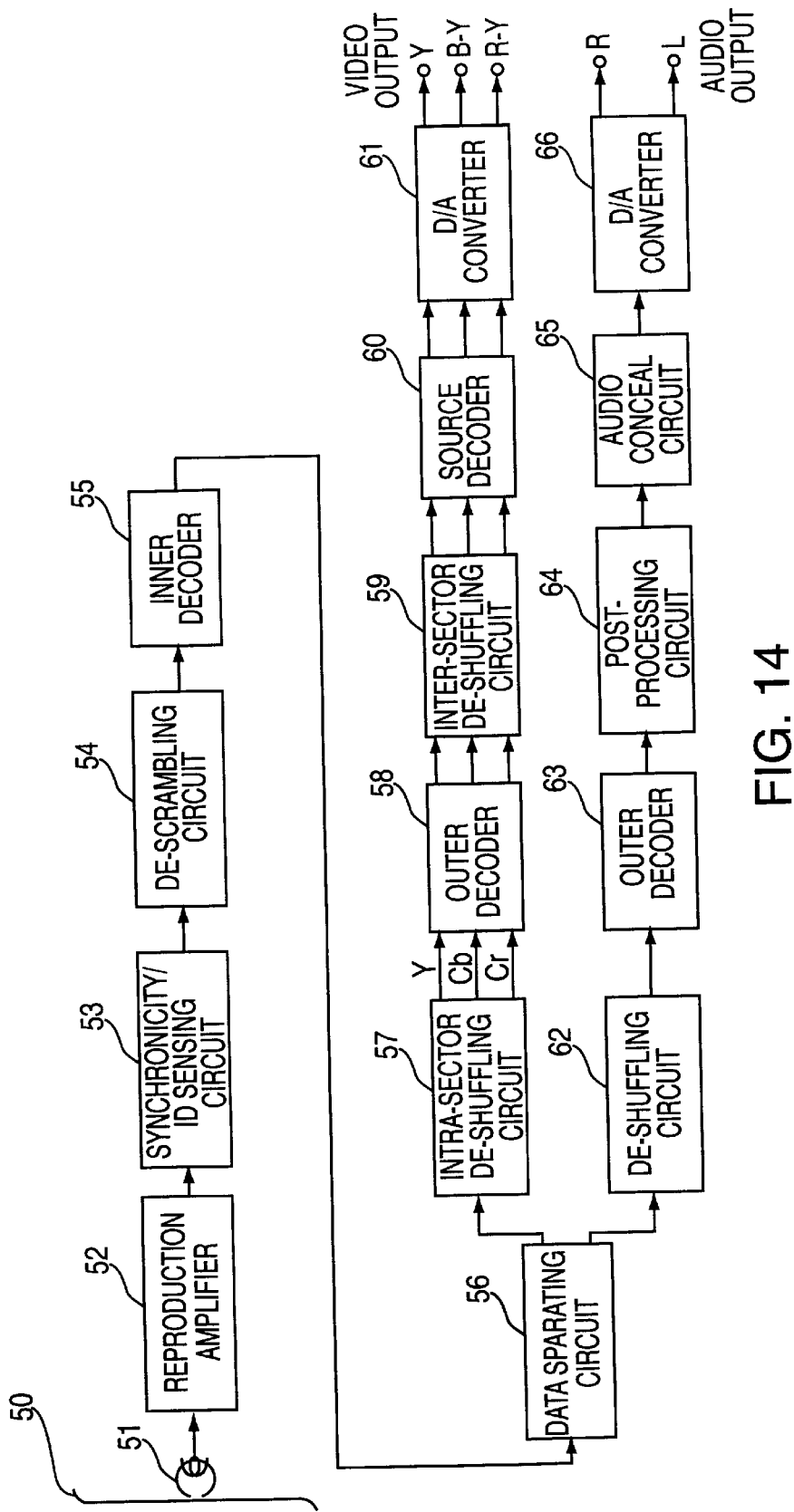
FIG. 14 is a block diagram showing the video and audio processing system of a D-1 video player used as the modifying digital video tape player of FIG. 3.

The schematic arrangement of the video and audio processing system of the D-1 video tape player are shown in FIG. 14. The digital signal recorded on a magnetic tape 50 is reproduced with a reproducing head 51 and then is amplified by a reproduction amplifier 52. The reproduced output of the reproduction amplifier 52 is supplied to a synchronicity/ID sensing circuit 53. The synchronicity/ID sensing circuit 53 operates to sense a synchronous signal and an ID from the reproduced output, delimit the signal, and clarify a block number.

A de-scrambling circuit 54 operates to de-scramble the reproduced output and supply the de-scrambled, reproduced signal to an inner decoder 55. The inner decoder 55 executes an error correction with inner codes added to the reproduced signal and then supplies the corrected signal to a data separating circuit 56.

The data separating circuit 57 operates to separate the signal into a digital video signal and a digital audio signal and supplies the digital video signal to an intra-sector de-shuffling circuit 57. The digital audio signal in turn is supplied to a de-shuffling circuit 62. The intra-sector de-shuffling circuit 57 operates to de-shuffle the digital video signal over sectors and then supplies component digital video signals Y, Cb and Cr to an outer decoder 58.

The outer decoder 58 operates to supply error-corrected, digital video signals Y, Cb and Cr with outer codes to a D/A converter 61 through an inter-sector, de-shuffling circuit 59 and a source decoder 60. The D/A converter 61 operates to convert the digital video signals Y, Cb and Cr into analog component video signals Y, B-Y and R-Y and then outputs those analog signals.

As for the audio signal, a de-shuffling circuit 62 operates to de-shuffle the digital audio signal separated by the data separating circuit 56. The de-shuffled digital audio signal is error-corrected by the outer decoder 63. Then, the error-corrected signal is supplied to a D/A converter 66 through a post-processing circuit 64 and an audio conceal circuit 65. The D/A converter 66 operates to convert the digital audio signal into an analog audio signal and then, for example, outputs R- and L-channel audio signals.

Figure 15:
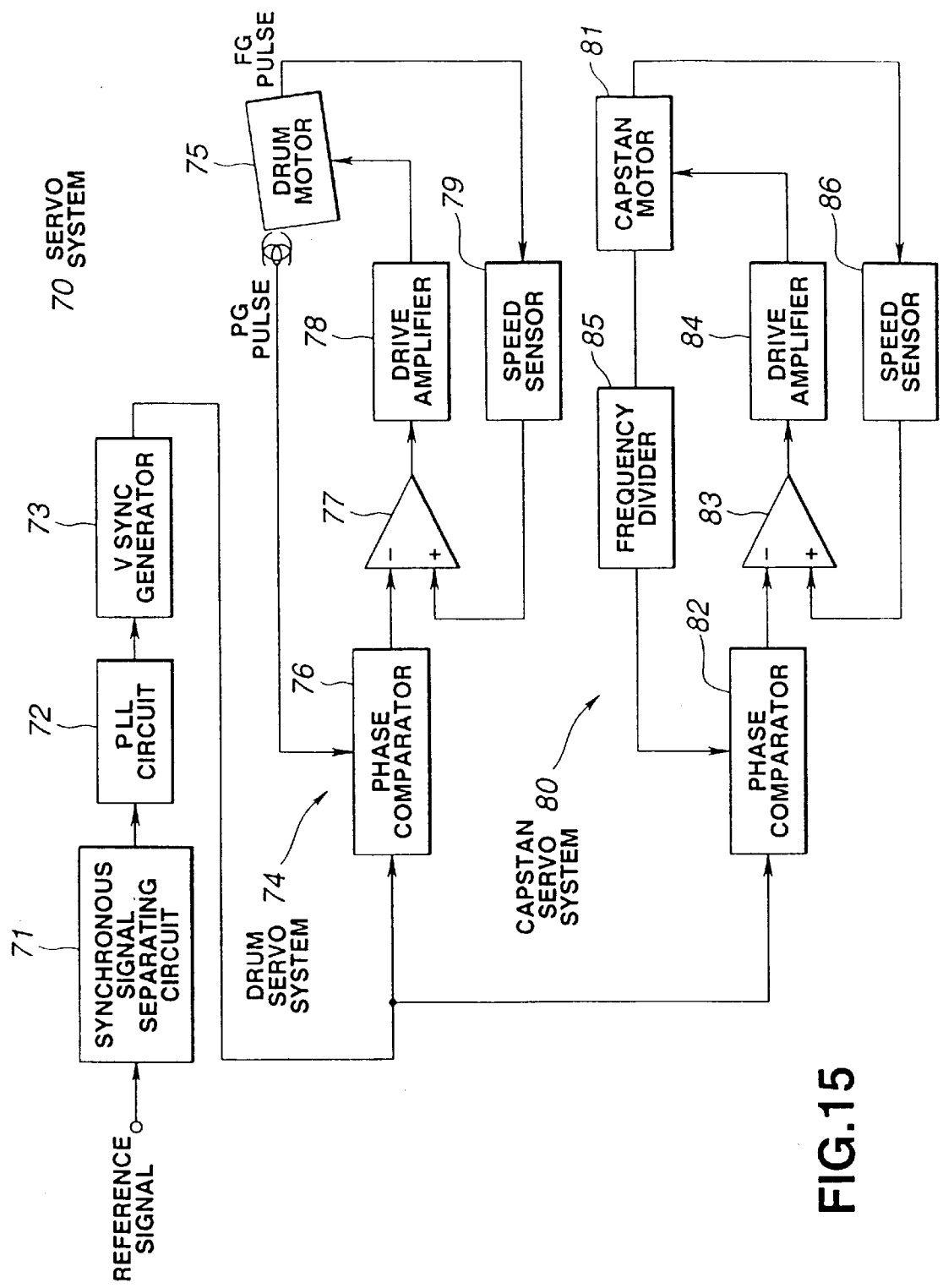
FIG. 15 is a block diagram showing the servo system of the D-1 video player of FIG. 14.

Further, the modifying digital video tape player 6 includes a servo system arranged as shown in FIG. 15. The servo system operates to convert the 625/50 video signal recorded on the magnetic tape 50 to a signal with a field frequency of 47.95 Hz. This is accomplished via a synchronous signal separating circuit 71. The synchronous signal separating circuit operates to extract a horizontal synchronous signal from the input reference signal and supply it to a phase locked loop (PLL) circuit 72. This PLL circuit 72 includes a voltage controlled oscillator (called VCO) whose LC is variable as mentioned below. The VCO enables the frequency of an oscillating clock to be varied by changing a C value according to the reference signal. The PLL circuit 72 operates to supply clock signals to a vertical synchronous (SYNC) generator 73. The vertical synchronous signal generated by the VSYN generator 73 is supplied to a drum servo system 74 and a capstan servo system 80.

The drum servo system 74 includes a phase comparator 76 for comparing a drum rotation pulse (PG) with the vertical synchronous signal. The phase comparator 76 supplies a phase control signal to an inverted input terminal of an operational amplifier 77. The operational amplifier 77 receives a speed control signal sensed by a speed sensor 79 in the form of a frequency generating (FG) pulse also sent from drum motor 75. The derived output of the operational amplifier 77 is amplified by a driving amplifier 78 and then is supplied to drum motor 75. The amplified signal is used for correcting the number of rotations and the slippage of the rotation phase of the drum motor 75.

The capstan servo system 80 also includes a phase comparator 82 for comparing a signal derived by dividing the reproduced control signal from a frequency divider 85 by the vertical synchronous signal. The phase comparator 82 supplies the phase control signal to an inverted input terminal of an operational amplifier 83. The operational amplifier 83 also receives a speed control signal sensed by a speed sensor 86 in the form of a frequency generating (FG) pulse from a capstan motor 81. The output of the operational amplifier 83 is amplified by a drive amplifier 84 and is then supplied to a capstan motor 81. This signal is used for correcting slippage of the number of rotations and the rotation phase of the capstan motor 81.

Figure 16:
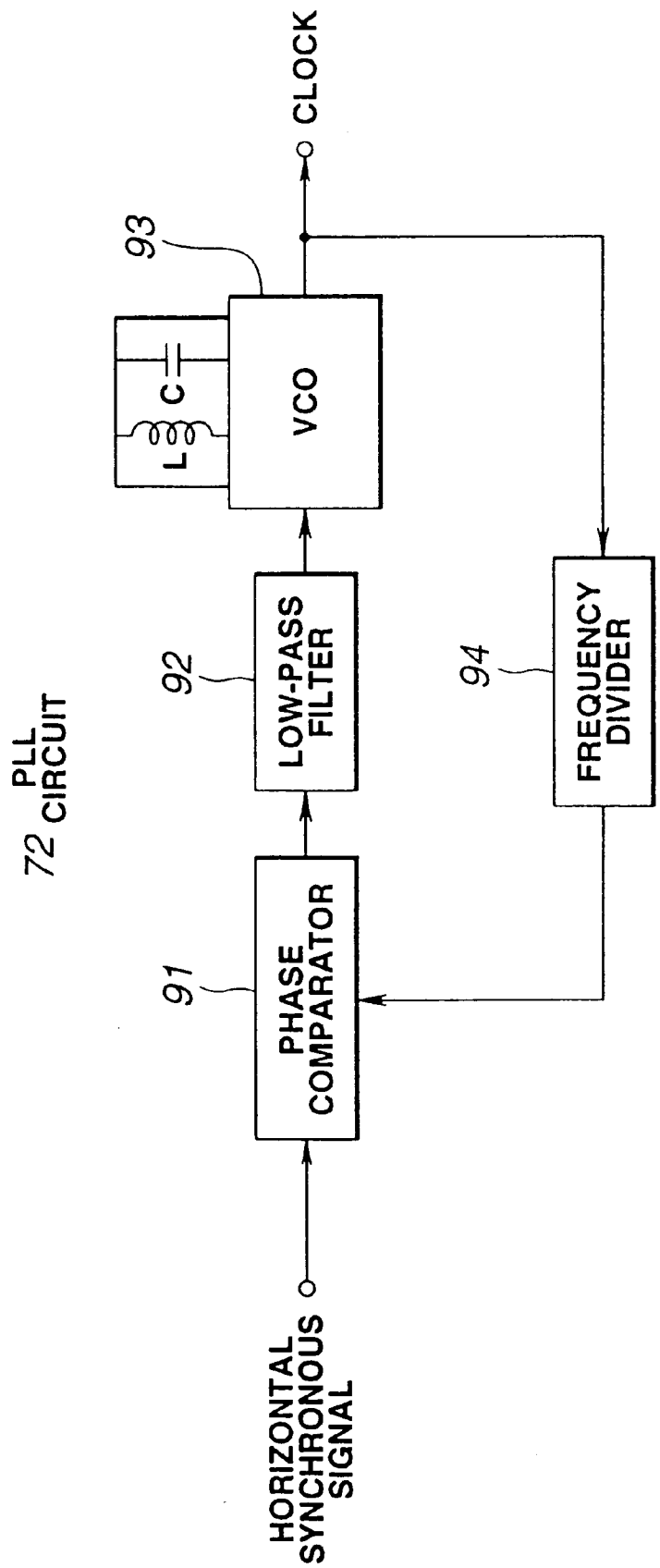
FIG. 16 is a block diagram showing a PLL circuit that is a component of the servo system of FIG. 15.

The arrangement of the PLL circuit 72 is shown in FIG. 16. The PLL circuit 72 includes a phase comparator 91, a low-pass filter 92, a VCO 93, and a frequency divider 94. The phase comparator 91 operates to compare a horizontal synchronous signal extracted by the synchronous signal separating circuit 71 (FIG. 15) with a clock signal obtained by dividing the frequency of the output clock of the VCO by a predetermined rate via frequency divider 94.

The low-pass filter 92 operates to supply its output to the VCO 93. This VCO 93 enables a switch of the generating clock between 47.95 Hz and 49.95 Hz, for example, by changing the C value. Hence, the modifying digital video tape player 6 enables the reproduction of a 625/47.95 video signal from a 625/50 video signal.

Figure 17:
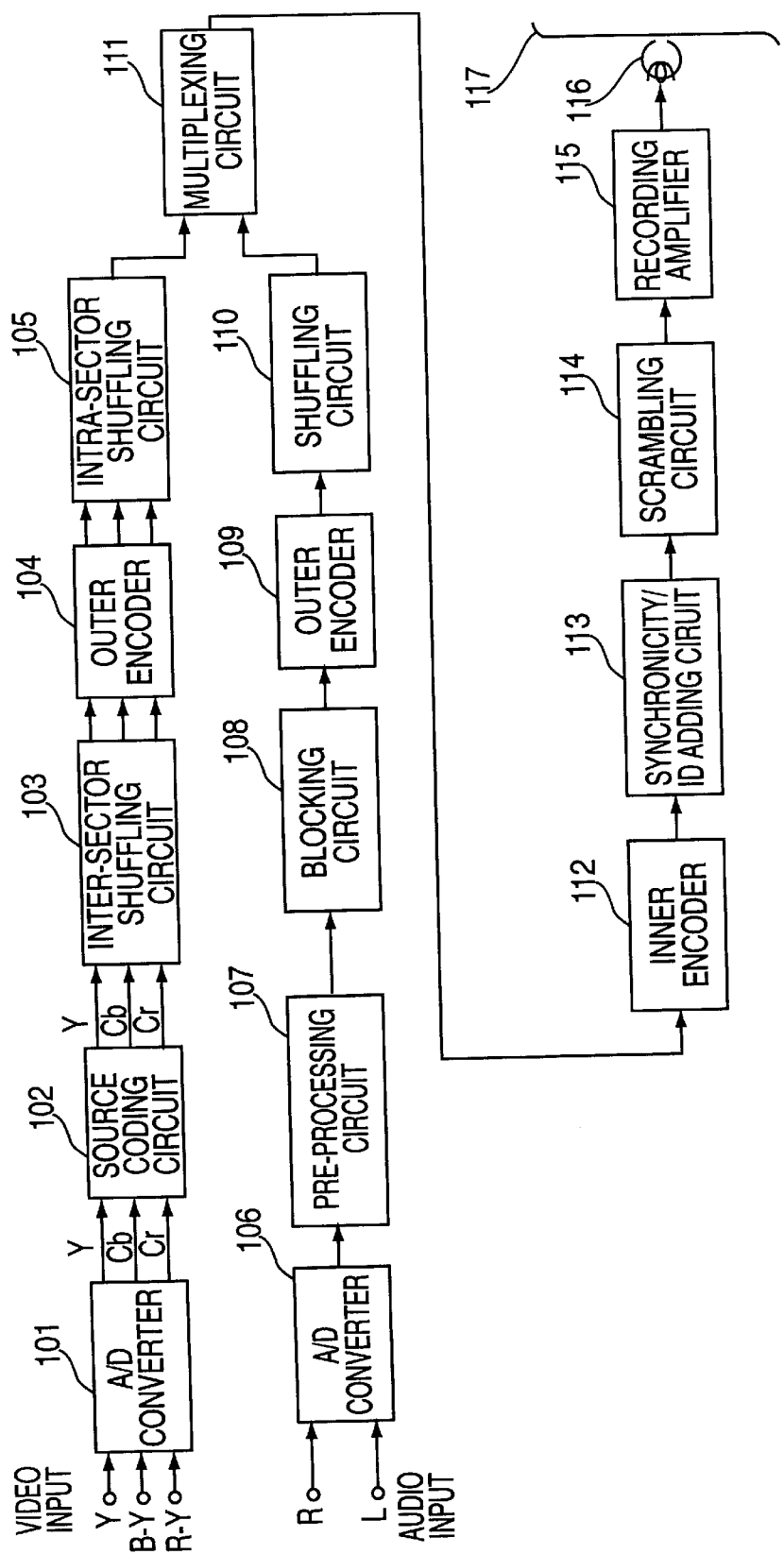
FIG. 17 is a block diagram showing a video and audio processing system of a D-1 video recorder used as the digital video tape recorder of FIG. 3.

Further, the digital video tape recorder 8 (FIG. 3) may be a D-1 video tape recorder. The schematic arrangement of the video and the audio processing system of the D-1 video tape recorder are shown in FIG. 17.

The component video signals Y, B-Y and R-Y are converted into the corresponding digital video signals Y, Cb and Cr by the A/D converter 101. These digital video signals Y, Cb and Cr are supplied to a source coding circuit 102.

The source coding circuit 102 operates to encode the digital video signals Y, Cb and Cr with weight sequence codes. This process transcodes each 8-bit byte during record so that, during playback, when the data bytes are converted back to their natural binary form, the peak error produced by single or double-bit errors is reduced. The digital video signals Y, Cb and Cr encoded by the source coding circuit 102 are supplied to an inter-sector shuffling circuit 103.

The inter-sector shuffling circuit 103 performs the inter-sector shuffling operation on the digital video signals Y, Cb and Cr. An outer encoder 104 located at a later stage may sense an error but may not correct it with the error correcting codes (ECC). While the error may be processed so that it is made less conspicuous, if the pixels to be modified are concentrated on an area of the screen, the degradation of the picture quality cannot be neglected. To overcome this problem, the inter-sector shuffling circuit 103 operates to replace the occurring sequence of the video codes with the sequence of the recording codes among sectors. The inter-sector shuffling circuit 103 operates to supply the shuffled output to the outer encoder 104.

The outer encoder 104 adds an ECC to the shuffled output. Specifically, the shuffled output is delimited into blocks each having a predetermined length. Then, a 2-word Reed-Solomon product code (checking code) for an outer code is generated by a predetermined operation and is added to each block. The encoded output of the outer encoder 104 is supplied to an intra-sector shuffling circuit 105. The intra-sector shuffling circuit 105 performs a shuffling process among the sectors of the encoded output. Specifically, the codes located two-dimensionally after the outer checking code is generated are re-arranged within the same two-dimensional block as randomly as possible.

The analog audio signal such as the R- and L-channel signals are converted into digital audio signals by the A/D converter 106. This digital audio signal is supplied to a pre-processing circuit 107 in which pre-processing is executed. Then, the pre-processed signal is supplied to a blocking circuit 108. The blocking circuit 108 operates to block the audio signal and supply the block signal to an outer encoder 109. The outer encoder 109 operates to add an ECC to the audio signal and supply the resulting signal to a shuffling circuit 110. The shuffling circuit 110 operates to shuffle the signal.

The shuffled video output from the intra-sector shuffling circuit 105 and the shuffled audio output from the shuffling circuit 110 are applied to a multiplex circuit 1 11. The multiplex circuit 111 operates to time-divisionally multiplex the video shuffled output and the audio shuffled output. The multiplexed output is supplied to an inner encoder 112. The inner encoder 112 operates to add a common inner code that is a type of ECC to the multiplexed output. The encoded output is supplied from the inner encoder 112 to a synchronicity/ID adding circuit 113.

The audio and the video signals are composed on a common format called a synchronous block. The synchronicity/ID adding circuit 113 operates to add to two inner code blocks an ID pattern indicating a synchronous pattern and a block number and to output it as one synchronous block to a scrambling circuit 114. The scrambling circuit 114 operates to supply the scrambled output as recording current to a head 116 through a recording amplifier 115 and a rotary transformer. With the head 116, the scrambled output is digitally recorded on a magnetic tape 117 in a manner suitable for high-density recording.

The digital video tape recorder such as the D-1 video tape recorder realizes higher picture and audio quality of the recorded signal and a higher dubbing characteristic than an analog video tape recorder. The quality of the picture reproduced from the digitally recorded data mainly depends on parameters for coding and is largely uninfluenced by the recording and reproducing characteristic. For example, the waveform distortion of the reproduced picture is limited to the distortion provided by an analog circuit before and after the A/D and the D/A conversions. The distortion and the noise appearing when recording or reproducing the data are made to be the erroneous reproduced codes. Those erroneous codes are factors to degrading the picture quality. However, if an error rate is equal to or less than a certain value, the use of the error correcting codes makes it possible to correct or modify the erroneous codes. As will be understood from the aforementioned discussion, the digital recording may offer a higher picture quality than the analog recording. In particular, the advantage of the digital recording is most distinguishable in dubbing.

As set forth above, the adapter 7 provided in the picture information editing system 5 operates to write to the system-converted video signal the improper editing location information such as the "No-good" mark indicating a frame composed of different pre-conversion frames and then outputs the converted time code. Then, the digital video tape recorder 8 operates to record the system-converted video signal and the converted time code having the improper editing location information written therein to the video tape cassette 9 for editing. The editor 10 recognizes the improper editing location information in the data recorded on the video tape cassette 9 when it edits the data. Hence, the picture information editing system 5 automatically distinguish a proper start point for editing. Since the digital video tape player and the digital video tape recorder are used for reproducing and recording the data, no degradation of the picture quality takes place between the video signals before and after the system conversion.

Figure 2:
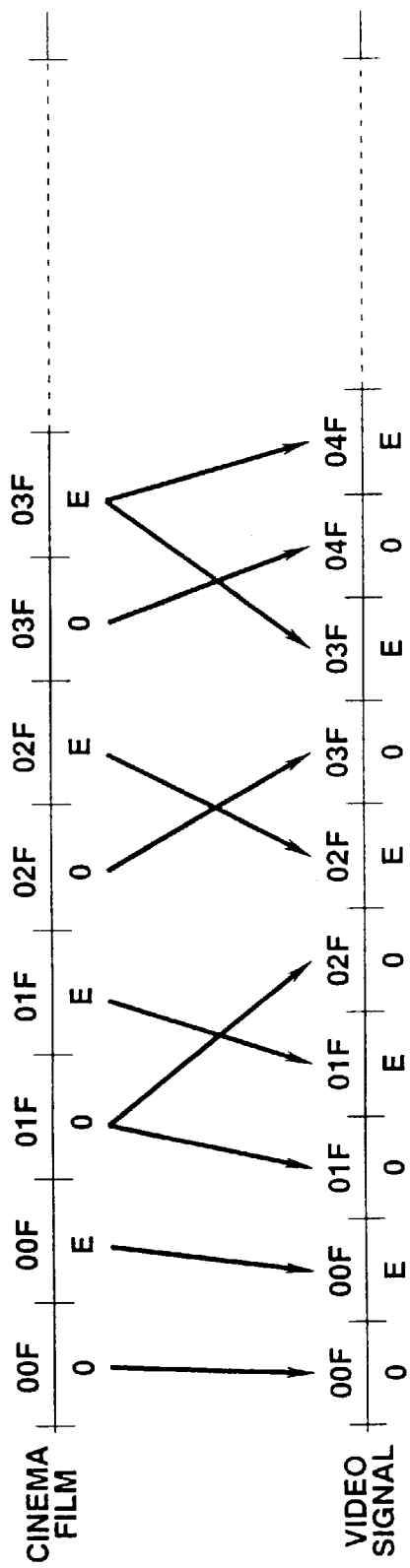
FIG. 2 shows the operation of the field frequency converting unit of FIG. 1.

The adapter 7 of the editing system 5 has been described in connection with the use of the LTC as the time code. Instead, the VITC read by the VITC reader 14 may be used as the time code. This VITC contains the field information such as odd fields or even fields as shown in FIGS. 2, 9 and 11.

More particularly, the VITC operates to supply the field information containing the odd fields and the even fields to the CPU 17. The CPU 17 is enabled to promptly establish a target time code even if a source time code is at any location inside of the sequence. This is accomplished by obtaining the time code and the field information from the VITC on the picture allocated to the target time code. The time code with the VITC makes it possible to specify a field within the frame. Hence, the "No-good" mark indicated at a frame unit as shown in FIGS. 9 and 11 is allowed to be written at a field unit. The editing start point may be changed from the odd field to the even field.

Figure 18:
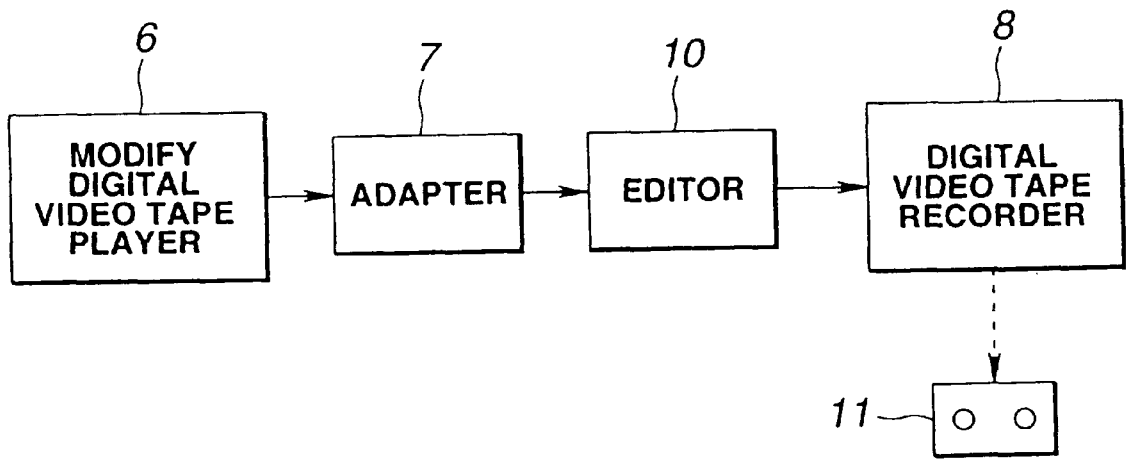
FIG. 18 is a block diagram showing an alternative embodiment of a picture information editing system of the present invention.

Further, according to another embodiment of the present invention, a system for editing picture information shown in FIG. 18 may be considered.

In the system 120, the editor 10 is operated to directly edit the converted video signal with the converted time code generated by the adapter 7 and then record the edited result on the video tape cassette 11 through the operation of a digital video tape recorder 8. The arrangement of each component is the same as described above.

It should be also noted that while the picture information editing system 5 enables the CPU 17 to generate improper editing location information, instead, the system 5 could enable the CPU 17 to generate proper editing location information.

Thus it is apparent that in accordance with the present invention, an apparatus and method that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for processing a time code for automatically determining an editing point comprising the steps of:
    receiving field sequence information:
        generating, in response to said field sequence information, a mark signal indicating whether or not a location is proper for editing during the conversion of picture information of a first system having a first time code into picture information of a second system having a second time code;
    writing said mark signal to said second time code of said second system; and
    receiving a speed control signal for controlling a reproducing speed of a video signal, wherein said first time code is converted to said second time code based on said speed control signal and wherein said speed control signal indicates how much said reproducing speed of said video signal is varied in comparison with a recording speed of an input video signal.

2. An apparatus for processing a time code for automatically determining an editing point when converting picture information of a predetermined system into picture information of a second system, comprising:
    means for receiving field sequence information:
        means for generating, in response to said field sequence information, a mark signal indicating whether a location is proper for editing;
    means for generating converted time code by writing said mark signal from said means for generating information onto time code data accompanied with said picture information of said second system; and
    means for receiving a speed control signal for controlling a reproducing speed of a video signal, wherein said means for generating converted time code writes said mark signal onto said time code data based on said speed control signal and wherein said speed control signal indicates how much said reproducing speed of said video signal is varied in comparison with a recording speed of an input video signal.

3. The method of claim 1, wherein said mark signal is written to a binary group of said second time code.

4. The method of claim 1, wherein said field sequence information indicates how picture fields of an input video signal are re-ordered.

5. The apparatus of claim 2, wherein said mark signal is written to a binary group of said time code data.

6. The apparatus of claim 2, wherein said field sequence information indicates how picture fields of an input video signal are re-ordered.

7. A picture information editing system, comprising:
    a player for variably reproducing a video signal of a first format recorded on a recording medium to produce a variably reproduced video signal;
    a converter for converting said variably reproduced video signal into a video signal of a second format and producing field sequence information;
    a time code reader for obtaining a time code from said variably reproduced video signal;
    an interface for feeding a speed control signal for controlling a reproducing speed of said variably reproduced video signal;
    a mark generator for generating, in response to said field sequence information, a mark
    signal indicating whether or not a location is proper for editing;
    a converted time code data generator for generating converted time code data based on said speed control signal and said time code from said time code reader;
    a converted time code generator for generating a converted time code by writing said mark signal to said converted time code data; and,
    an editor for editing said video signal of said second format in response to said converted time code wherein said speed control signal indicates how much said reproducing speed of said variably reproduced video signal is varied in comparison with a recording speed of a video signal recorded on said recording medium.

8. The system of claim 7, wherein said mark signal is written to a binary group of said converted time code data.

9. The system of claim 7, wherein said field sequence information indicates how picture fields of said variably reproduced video signal are re-ordered when said converter converts said variably reproduced video signal from said first format to said second format.

* * * * *